United States Patent
Kang et al.

(10) Patent No.: US 9,858,470 B2
(45) Date of Patent: Jan. 2, 2018

(54) METHOD FOR PERFORMING A FACE TRACKING FUNCTION AND AN ELECTRIC DEVICE HAVING THE SAME

(71) Applicant: HTC Corporation, Taoyuan (TW)

(72) Inventors: Ming-Che Kang, Taoyuan (TW); Chung-Ko Chiu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 124 days.

(21) Appl. No.: 14/748,974

(22) Filed: Jun. 24, 2015

(65) Prior Publication Data
US 2016/0019412 A1   Jan. 21, 2016

Related U.S. Application Data

(60) Provisional application No. 62/026,033, filed on Jul. 18, 2014.

(51) Int. Cl.
| | |
|---|---|
| G06K 9/00 | (2006.01) |
| H04N 5/232 | (2006.01) |
| H04N 7/14 | (2006.01) |
| G06T 7/20 | (2017.01) |

(52) U.S. Cl.
CPC ..... *G06K 9/00221* (2013.01); *G06K 9/00228* (2013.01); *G06T 7/20* (2013.01); *H04N 5/232* (2013.01); *H04N 7/147* (2013.01); *G06T 2207/30201* (2013.01)

(58) Field of Classification Search
CPC .. G06K 9/00221; G06K 9/00228; G06T 7/20; G06T 2207/30201; H04N 5/232; H04N 7/147
See application file for complete search history.

(56) References Cited

U.S. PATENT DOCUMENTS

| | | | |
|---|---|---|---|
| 8,265,349 B2* | 9/2012 | Wang | G06K 9/00234 382/118 |
| 2007/0076957 A1 | 4/2007 | Wang et al. | |
| 2010/0060783 A1* | 3/2010 | Belt | H04N 19/132 348/441 |

(Continued)

FOREIGN PATENT DOCUMENTS

| | | |
|---|---|---|
| CN | 1747546 A | 3/2006 |
| CN | 201213278 Y | 3/2009 |

(Continued)

*Primary Examiner* — Shefali Goradia
(74) *Attorney, Agent, or Firm* — Birch, Stewart, Kolasch & Birch, LLP

(57) ABSTRACT

A method for performing a method for performing a performing a face tracking function in an electric device is provided. The electric device has a touch panel, a camera, and a processor. The method includes the following steps. A touch signal is receiving by the touch panel. Under a video call, a face tracking mode is entered based on the touch signal by the processor. Face tracking is performed on a captured frame from the camera to obtain at least one region of interesting (ROI) of the captured frame by the processor, each of the ROI having an image of a face. A target frame is generated by combining the at least one ROI by the processor. The target frame is transmitted to another electric device by the processor, so that the target frame is shown on the another electric device as a video talk frame.

20 Claims, 8 Drawing Sheets

(56) References Cited

U.S. PATENT DOCUMENTS

| | | | | |
|---|---|---|---|---|
| 2010/0245532 A1* | 9/2010 | Kurtz | ................ | G06K 9/00711 |
| | | | | 348/14.03 |
| 2011/0085016 A1* | 4/2011 | Kristiansen | ......... | G06F 3/04883 |
| | | | | 348/14.03 |
| 2012/0113209 A1* | 5/2012 | Ritchey | ................ | H04N 5/2254 |
| | | | | 348/14.02 |
| 2012/0268552 A1 | 10/2012 | Choi et al. | | |

FOREIGN PATENT DOCUMENTS

| CN | 103310411 A | 9/2013 |
|---|---|---|
| CN | 103838367 A | 6/2014 |
| CN | 103916623 A | 7/2014 |
| EP | 2 688 295 A2 | 1/2014 |
| TW | 201410004 A | 3/2004 |
| TW | 201101130 A1 | 1/2011 |
| TW | 201415883 A | 4/2014 |

* cited by examiner

| Application Name | Texting | Voice Call | Video Call | Video Call Switch Fout/Bank Camera | Group Call | Send/Receive Multimedia | Size |
|---|---|---|---|---|---|---|---|
| WeChat | Y | V | V | V | V | V | Varies by device |
| Line | V | V | V | V | N | V | 19M |
| Skype | V | V | V | V | V | V | Varies by device |
| Tango | V | V | V | V | N | V | 22M |
| Hangouts | V | V | V | V | V | V | 11M |
| 00VOO | V | V | V | V | V | V | 21M |

FIG. 3

METHOD FOR PERFORMING A FACE TRACKING FUNCTION AND AN ELECTRIC DEVICE HAVING THE SAME

This application claims the benefit of U.S. Provisional Application Ser. No. 62/026,033, filed Jul. 18, 2014, the disclosure of which is incorporated by reference herein in its entirety.

TECHNICAL FIELD

The disclosure relates in general to a method for performing a face tracking function and an electric device having the same, and more particularly to a method for performing a face tracking function and an electric device having the same under a video call.

BACKGROUND

Description of the Related Art

In recent years, the resolution of the front camera of the electric device is getting higher and higher, and the use of video talk has become more and more popular. Therefore, how to provide the user with a diversified application with the video talk is emphasized by the industry.

SUMMARY

According to one embodiment, a method for performing a performing a face tracking function in an electric device is provided. The electric device has a touch panel, a camera, and a processor. The method includes the following steps. A touch signal is receiving by the touch panel. Under a video call, a face tracking mode is entered based on the touch signal by the processor. Face tracking is performed on a captured frame from the camera to obtain at least one region of interesting (ROI) of the captured frame by the processor, each of the ROI having an image of a face. A target frame is generated by combining the at least one ROI by the processor. The target frame is transmitted to another electric device by the processor, so that the target frame is shown on the another electric device as a video talk frame.

According to another embodiment, an electric device for performing a face tracking function is provided. The electric device includes a touch panel, a camera, and a processor. The touch panel is for receiving a touch signal. The camera is for capturing a frame. The processor is for entering a face tracking mode based on the touch signal under a video call, and performing face tracking on the captured frame from the camera to obtain at least one ROI of the captured frame, each of the ROI having an image of a face. The processor is further for generating a target frame by combining the at least one ROI, and for transmitting the target frame to another electric device, so that the target frame is shown on the another electric device as a video talk frame.

According to another embodiment, a non-transitory storage media for storing a program code is provided. When the program code is executed by an electric device, the electric device performs a method for performing a face tracking function. The electric device has a touch panel, a camera, and a processor. The method includes following steps. A touch signal is received by the touch panel. Under a video call, a face tracking mode is entered based on the touch signal by the processor. Face tracking on a captured frame from the camera is performed to obtain at least one region of interesting (ROI) of the captured frame by the processor, each of the ROI having an image of a face. A target frame is generated by combining the at least one ROI by the processor. The target frame is transmitted to another electric device by the processor, so that the target frame is shown on the another electric device as a video talk frame.

BRIEF DESCRIPTION OF THE DRAWINGS

FIG. 3 shows an example of the white list.

Figure 1:
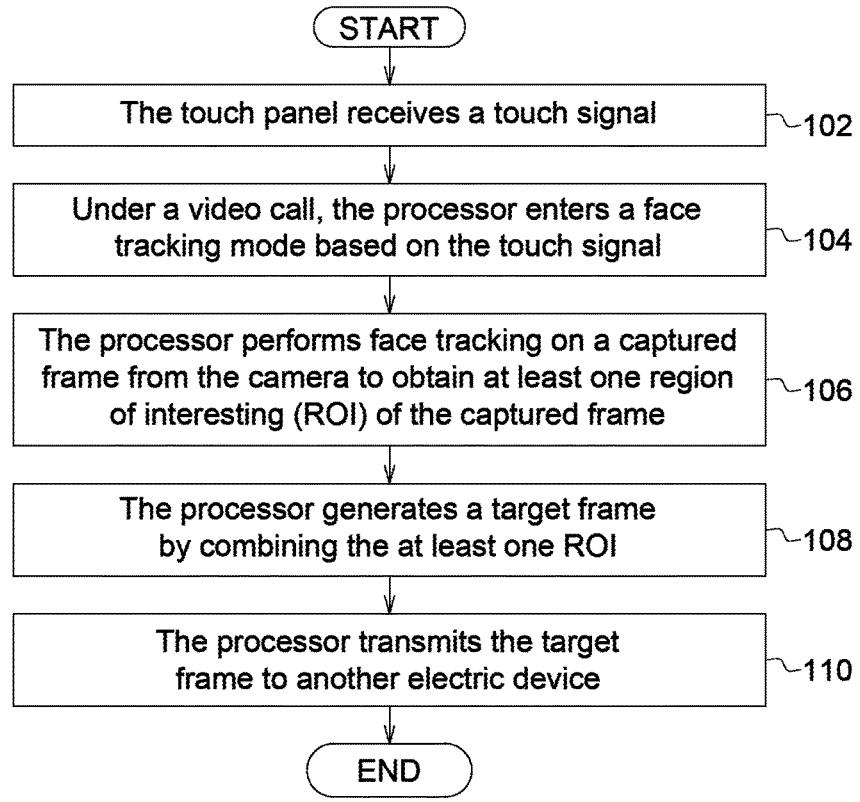
FIG. 1 shows a flow chart for a method for performing a face tracking function in an electric device according to an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
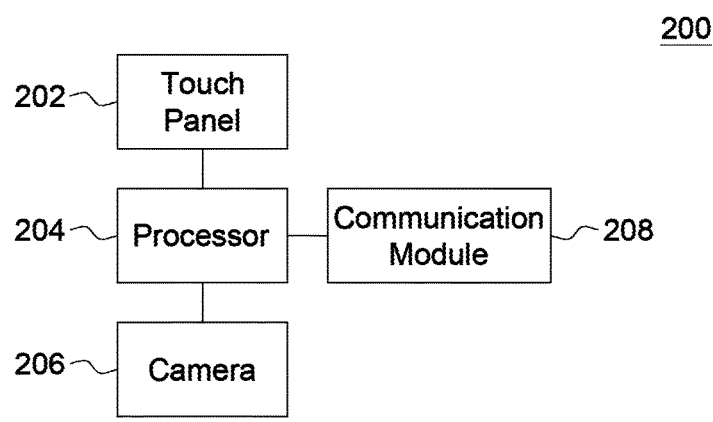
FIG. 2 shows the block diagram of the electric device.

FIG. 1 shows a flow chart for a method for performing a face tracking function in an electric device according to an embodiment of the invention. The block diagram of the electric device 200 is shown in FIG. 2. The electric device 200 has a touch panel 202, a processor 204, and a camera 206. The method includes the following steps. First, in step 102, the touch panel 202 receives a touch signal. Second, in step 104, under a video call, the processor 204 enters a face tracking mode based on the touch signal. Next, in step 106, the processor 204 performs face tracking on a captured frame from the camera 206 to obtain at least one region of interesting (ROI) of the captured frame. Each of the ROI has an image of a face. After that, in step 108, the processor 204 generates a target frame by combining the at least one ROI. Then, in step 110, the processor 204 transmits the target frame to another electric device, so that the target frame is shown on the another electric device as a video talk frame.

Therefore, even if the application currently executed by the electric device 200 for the video call do not provide the face tracking function, the electric device 200 according to the embodiment can perform the face tracking function and transmits the target frame to the another electric device as a video talk frame. That is, the target frame can replace the frame of the video talk, and the target frame can be transmitted by the same way as a frame for video talk to another electric device to achieve the face tracking function.

When the electric device 200 runs a communicating program to perform video talk with another electric device, the touch panel 202 can further display a floating control interface. The floating control interface has a face tracking control item. When the face tracking control item is selected, the touch panel 202 will receive the touch signal, and the processor 204 correspondingly enters the face tracking function based on the touch signal under a video call.

Furthermore, the touch panel 202 has the ability of touching and/or displaying. The electric device 200 can have a display (not shown) if the touch panel 202 does not have the ability of displaying. Frames can be displayed on the screen of the touch panel 202 or on the screen of the display. The electric device 200 can further have a communication module 208 for communicate with other electric device through wireless communication or through Internet.

The electric device 200 can be a mobile device, such as a smartphone or tablet PC. The operating system of the electric device 200 is, for example, Android operating system. The processor 204 determines whether the electric device 200 is performing the video talk by judging whether the communicating program for the video call is performed in foreground and whether the camera 206 is activated. When the communicating program for the video call is performed in foreground and the camera 206 is activated, the processor 204 determines that the electric device 200 is performing the video talk. The communicating program can be one of the applications which can perform video calls listed in a white list. The white list also contains other candidate communication programs. FIG. 3 shows an example of the white list.

If the application currently executed by the electric device 200 in the foreground is included in a white list of FIG. 3 and the camera 206 is already activated, it is determined that the electric device 200 is performing the video talk, and the floating control interface will be displayed on the screen. The floating control interface is an independent application from the communication programs and the floating control interface is not contained in the white list. The floating control interface can be used as a user operating interface.

Figure 4:
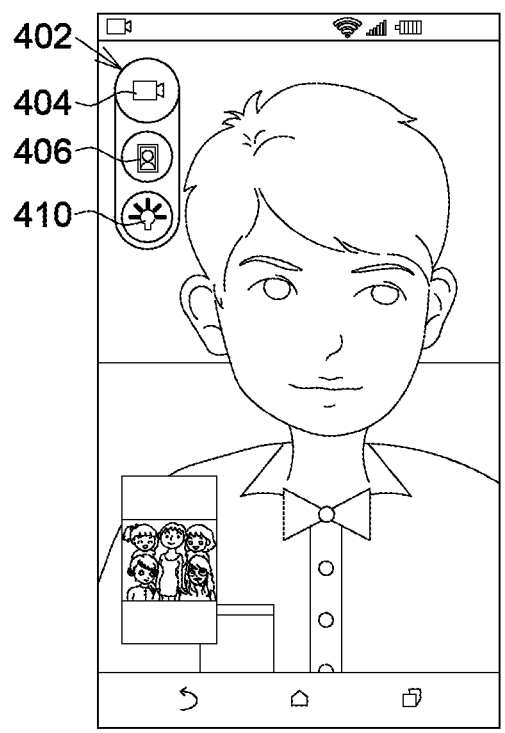
FIG. 4 shows an example of the floating control interface of the electric device according to an embodiment of the invention.

Referring to FIG. 4, an example of the floating control interface of the electric device 200 according to an embodiment of the invention is shown. The floating control interface 402 has a face tracking icon 406, acting as the face tracking control item mentioned above. The floating control interface 402 can further includes, for example, a normal mode icon 404, and a light filling icon 410, but is not limited thereto. Other icons can be added or some icons can be removed in the floating control interface 402 according to the functions that the electric device 200 requires.

Figure 5:
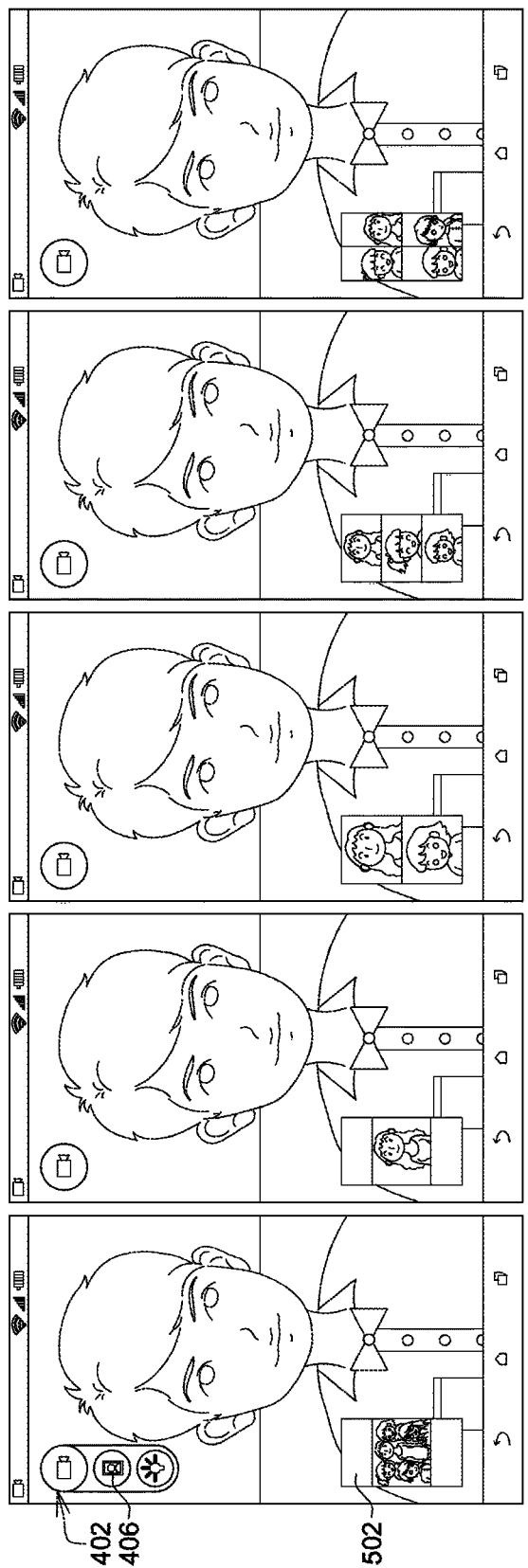
FIGS. 5A~5E shows the corresponding frames displayed on the electric device A.
Figure 6:
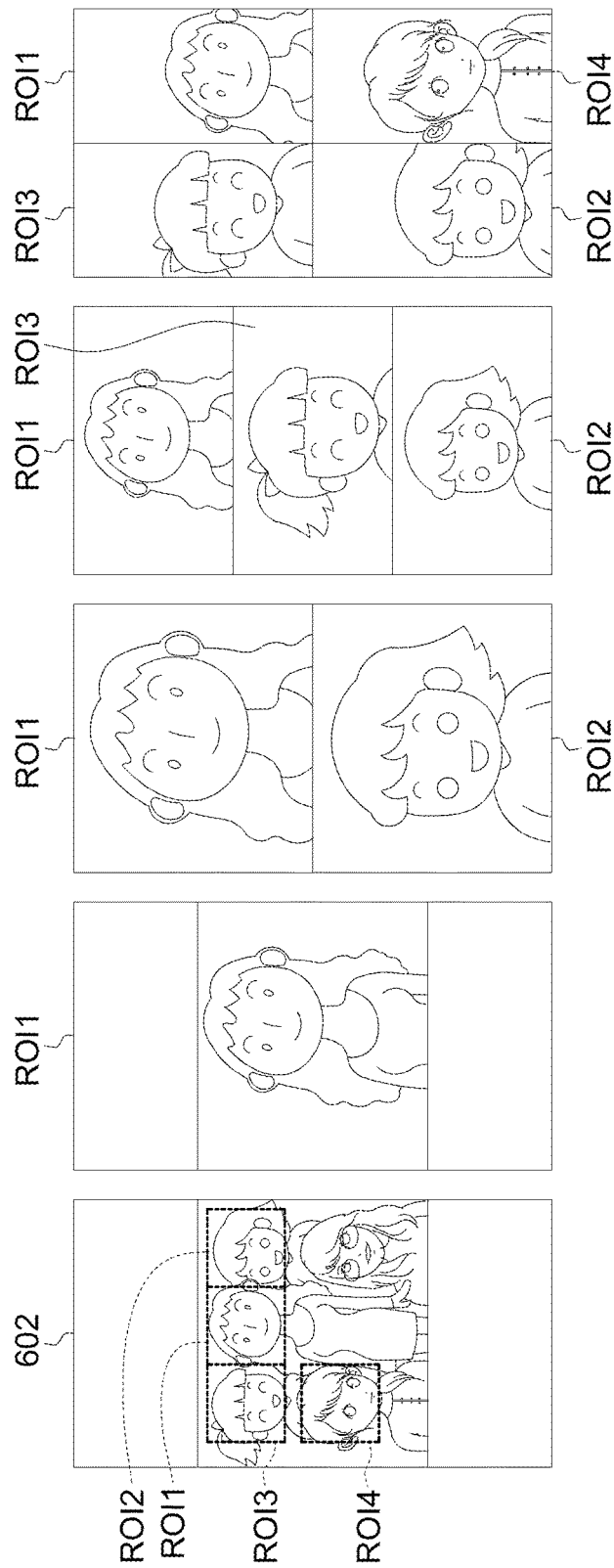
FIGS. 6A~6E shows the corresponding frames displayed on the electric device B.

When the user presses or selects the face tracking icon 406, the electric device 200 will execute following operations. Let the operations executed by the electric device A as indicated in FIGS. 5A~5E be taken for example. The electric device A, for example, is on a video talk with an electric device B, and corresponding frames displayed on the electric device B are shown in FIGS. 6A~6E. Referring to FIG. 5A, assume the local frame shot by the camera 206 of the electric device A is frame 502, which is further transmitted to the electric device B and displayed as frame 602 as illustrated in FIG. 6A.

If the application currently executed in the foreground of the electric device A is included in the white list of FIG. 3 and the camera 206 is already activated, the floating control interface 402 will be displayed by superposition on the frame of the electric device A as indicated in FIG. 5A. When the user of the electric device A selects the face tracking icon 406 of the floating control interface 402, the processor 204 will enter face tracking mode and the electric device A will start face tracking function, as shown in FIG. 5B. The electric device A will perform face tracking on the captured images to obtain at least a region of interest (ROI).

If one ROI is obtained, the ROI is enlarged, and the target frame is generated according to the enlarged ROI. That is, if the user of the electric device A selects region ROI1, the electric device A will merely enlarge the region ROI1 to form a target frame, and further transmit the target frame to the electric device B, as illustrated in FIG. 6B. The advantage of this method is that regardless of where the corresponding face of the region ROI1 moves to, the electric device A still can perform detection and tracking, so that the electric device B can continuously view the corresponding face of the region ROI1 without being affected by where the corresponding face of the region ROI1 moves to.

If more than one ROIs are obtained, the ROIs are enlarged, and the target frame is generated by combining the enlarged ROIs. For example, if the user of the electric device A selects regions ROI1 and ROI2, the electric device A will enlarge both regions ROI1 and ROI2 to form a target frame, and further transmit the target frame to the electric device B, as illustrated in FIG. 6C. Each of the regions ROI1 and ROI2 may occupy a half of the region of the target frame. Thus, the electric device A can transmit only the user's regions of interest ROI1 and ROI2 to the electric device B, so that the user of the electric device B can clearly view the enlarged regions ROI1 and ROI2.

If the user of the electric device A selects regions ROI1, ROI2, and ROI3, the electric device A will enlarge the regions ROI1, ROI2, and ROI3 to form a target frame, and further transmit the target frame to the electric device B, as illustrated in FIG. 6D. Each of the regions ROI1, ROI2, and ROI3 occupies one third of the region of the target frame. If the user of the electric device A selects regions ROI1, ROI2, ROI3, and ROI4, the electric device A will enlarge the regions ROI1, ROI2, ROI3, and ROI4 to form a target frame, and further transmit the target frame to the electric device B, as illustrated in FIG. 6E. Each of the regions ROI1, ROI2, ROI3, and ROI4 occupies one fourth of the region of the target frame, for example.

Figure 7:
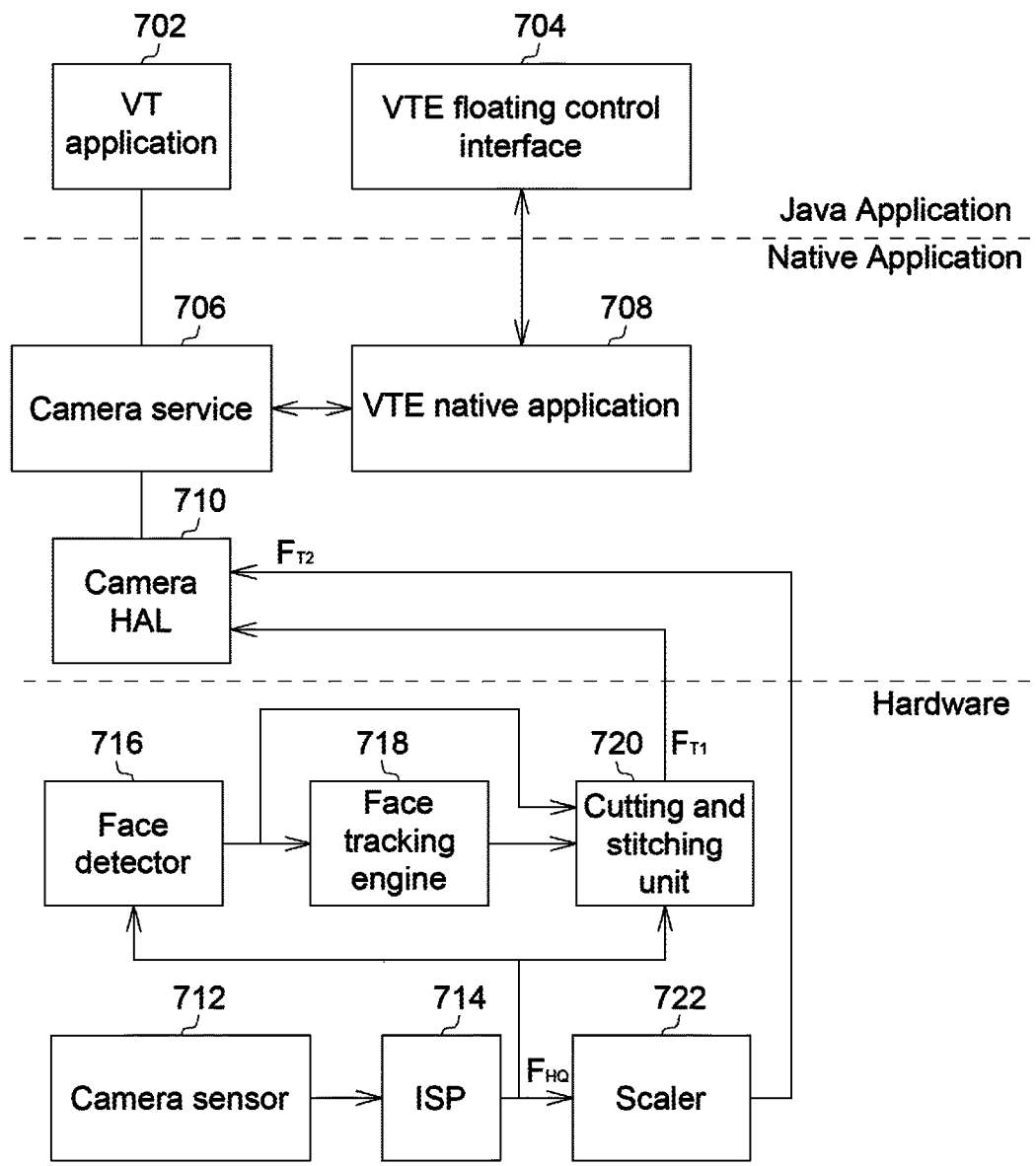
FIG. 7 shows an example of a software/hardware architecture of the electric device with face tracking function.

Referring to FIG. 7, an example of a software/hardware architecture of the electric device 200 with face tracking function is shown. After the video talk function is activated by the communication program, the floating control interface 402 will be automatically executed and displayed on the screen of the electric device 200. The communication program is, for example, a video talk (VT) application 702, and the floating control interface 402 is, for example, a video talk enhancement (VTE) floating control interface 704. The VT application 702 is included in the white list of FIG. 3, such as Skype or Line. Whether the video talk function is activated by the communication program is determined by judging if the VT application 702 is executed in the foreground and the camera 206 is already activated, which imply that the user is using the video talk function. After the VT application 702 is executed in the foreground and the camera 206 is already activated (this implies that the user is using the video talk function), the video talk enhancement (VTE) floating control interface 704, for example, the floating control interface 402 shown in FIG. 4, will be automatically executed and displayed on the screen of the electric device 200.

During the video talk under the normal mode, the VT application 702 will call the camera service 706 to activate the camera function, and the VTE floating control interface 704 will call the VTE native application 708. When the user of the electric device A selects the face tracking icon 406 of the floating control interface 402, the electric device A will start face tracking function. Meanwhile, the VTE floating control interface 704 will call the VTE native application 708 immediately. Then, the VTE native application 708 informs the camera service 706 that the electric device A will enter the face tracking mode. The VTE native application 708 will control the camera service 706 to obtain a target frame showing only one or more than one ROI to execute the face tracking function, and show the target frame on the screen of the electric device 200 and further transmit the target frame to electric device B.

Details of the method of generating the target frame are described below. Firstly, an image is capture by a camera sensor 712, wherein after the image was processed by the image signal processor (ISP) 714, a high resolution frame $F_{HQ}$ is obtained. The resolution of the high resolution frame $F_{HQ}$, for example, is equivalent to the highest resolution that the camera sensor 712 can generate or larger than the resolution of the target frame. The resolution of the target frame is determined according to the resolution selected or used by the VT application 702.

Next, when the user selects the face tracking function, the high resolution frame $F_{HQ}$ is transmitted to the face detector 716. The face detector 716 detects the location of at least one face image in the high resolution frame $F_{HQ}$. Then, the face detector 716 outputs the location information of the at least one face image to the face tracking engine 718. The face tracking engine 718 selects the location in a frame buffer according to the location information of the face image, wherein the frame buffer is for storing the frame to be shown. The location information of the at least one face image from the face detector 716, the location in the frame buffer determined by the face tracking engine 718, and the high resolution frame $F_{HQ}$ are inputted to the cutting and stitching unit 720. The cutting and stitching unit 720 further cuts and stitches at least one region of interest selected by the user to form a target frame $F_{T1}$ accordingly. The face detector 716, the face tracking engine 718, and the cutting and stitching unit 720 can be realized by a graphics processing unit (CPU), a central processing unit (CPU), or other processor, for example.

Then, the target frame $F_{T1}$ is transmitted to the camera service 706 through a camera hardware adaptation layer (HAL) 710, and is further shown on the screen of the electric device 200 by using the VTE application 702. Then, the target frame $F_{T1}$ is transmitted to the electric device B at the other end of video talk by the electric device A.

If the user only selects a normal mode instead of the face tracking function, the high resolution frame $F_{HQ}$ is transmitted to the scaler 722, which reduces the resolution of the high resolution frame $F_{HQ}$ to generate a target frame $F_{T2}$ with lower resolution and further transmits the target frame $F_{T2}$ to the camera HAL 710. Then, the target frame $F_{T2}$ is transmitted to the electric device B at the other end of video talk by the electric device A.

The VT application 702 and the VTE floating control interface 704 are, for example, Java applications implemented by Java language. The camera service 706, the VTE native application 708, and the camera HAL 710 are, for example, native applications. The VTE native application 708 can apply Binder mechanism of Android Inter-Process Communication (IPC) mechanism. The above architecture can be implemented under the Android operating system or other operating systems.

Figure 8C:
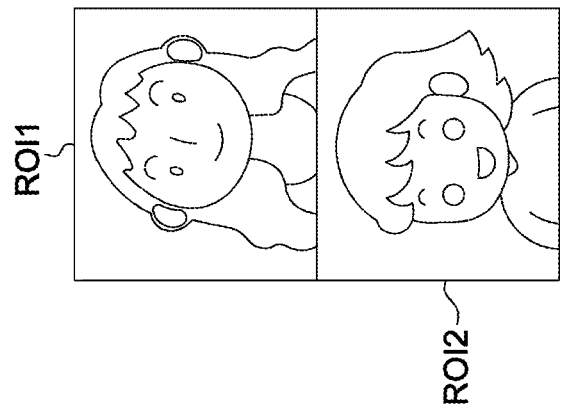
FIG. 8A to FIG. 8C illustrate the operation of the face detector, the face tracking engine, and the cutting and stitching unit.

The operation of the face detector 716, the face tracking engine 718, and the cutting and stitching unit 720 will be explained in more detailed with the example shown in FIG. 8A to FIG. 8C. After the high resolution frame $F_{HQ}$ is transmitted to the face detector 716, the face detector 716 detects the location of at least one face image in the high resolution frame $F_{HQ}$. As shown in FIG. 8A, the location of the face images are detected and marked with regions of interesting ROI1, ROI2, ROI3, and ROI4. Assume two regions of interesting are selected, for example, ROI1 and ROI2 are selected by user. Then, the face detector 716 outputs the location information of the face images, for example, the coordinates of ROI1 and ROI2 (such as the coordinates of the two corners in the diagonal of the rectangular ROI1 and ROI2) in the high resolution frame $F_{HQ}$, to the face tracking engine 718.

Figure 8B:
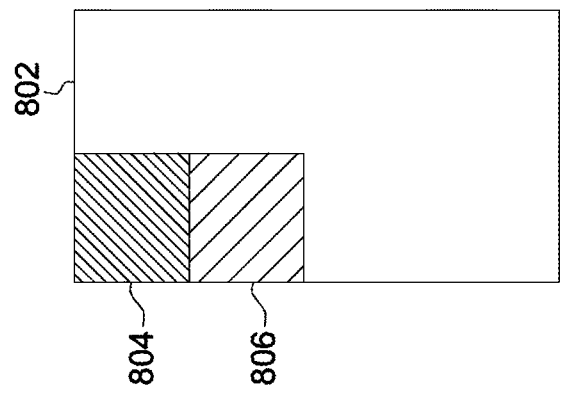
Figure 8A:
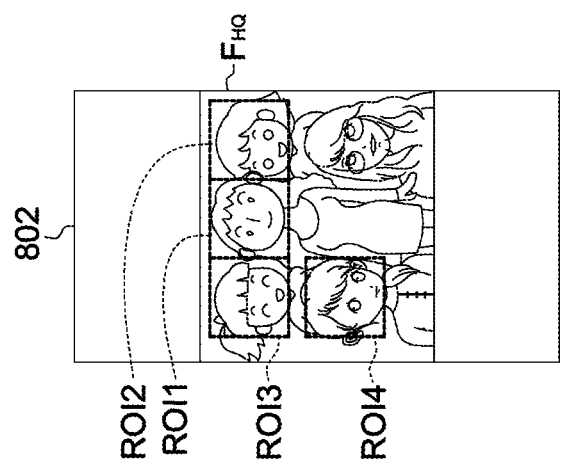

As shown in FIG. 8B, the face tracking engine 718 enlarges the region of at least one of ROI1 and ROI2, or scales the region of at least one of ROI1 and ROI2 to make the size of ROI1 and ROI2 to be suitable to be combined. The face tracking engine 718 also selects the location in a frame buffer 802 for ROI1 and ROI2, wherein the frame buffer 802 is used for storing the frame to be shown on the screen of the electric device 200. The face tracking engine 718 selects the location in a frame buffer 802 according to the coordinates of ROI1 and ROI2 and the scaled or enlarged sizes of the ROI1 and ROI2. Assume the face tracking engine 718 selects blocks 804 and 806 of the frame buffer 802 for ROI1 and ROI2. Then, the face tracking engine 718 outputs the address of blocks 804 and 806, for example, in the frame buffer 802 to the cutting and stitching unit 720. The high resolution frame $F_{HQ}$ and the coordinates of ROI1 and ROI2 in the high resolution frame $F_{HQ}$ are also inputted to the cutting and stitching unit 720. According to the coordinates of ROI1 and ROI2 in the high resolution frame $F_{HQ}$, the cutting and stitching unit 720 cuts the ROI1 and ROI2 from the high resolution frame $F_{HQ}$, and stores ROI1 and ROI2 in the blocks 804 and 806 in the frame buffer 802, and outputs the image of ROI1 and ROI2 which are combined together to form the target frame $F_{T1}$, which will be shown in the screen of the electric device 200, as shown in FIG. 8C. The resolution of the target frame $F_{T1}$ (the combined image of ROI1 and ROI2) is lower than the resolution of the resolution of the high resolution frame $F_{HQ}$.

Figure 9:
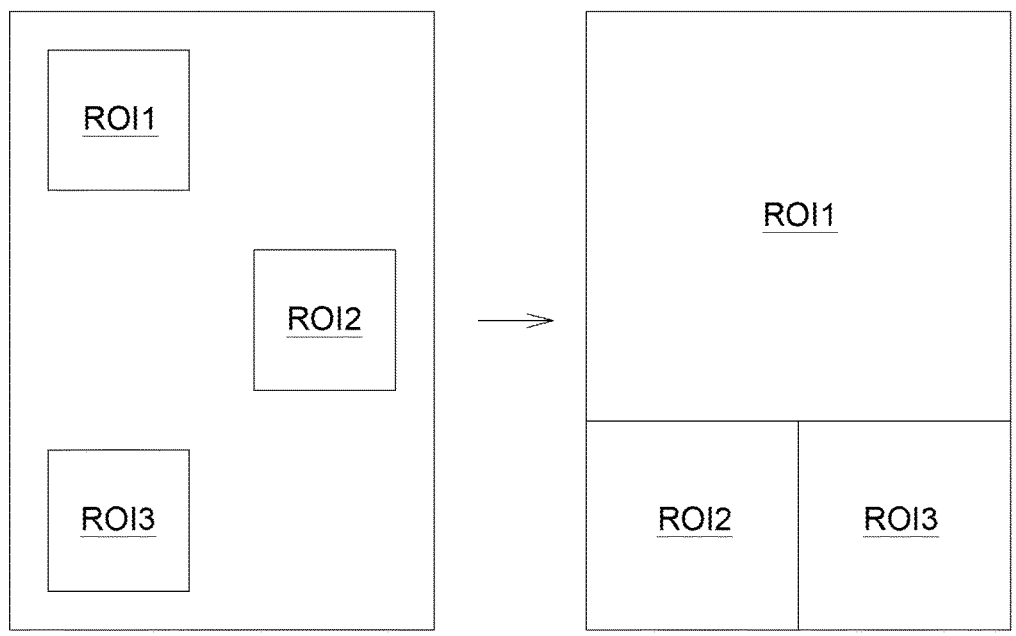
FIG. 9 shows another example of a target frame with three regions of interest.

Referring to FIG. 9, another example of a target frame with three regions of interest is shown. When the user selects three regions of interest ROI1~ROI3, the three regions of interest ROI1~ROI3 of the target frame $F_{T1}$ can be arranged in the same manner as illustrated in FIG. 6D or the manner as illustrated in FIG. 9. In FIG. 9, the region of interest ROI1 which is more important than other regions of interest is shown in a larger area. The size of the display area for other numbers of regions of interest is determined according to parameters such as importance of region or distance to the camera.

Besides, the electric device 200 can further provide a light filling function. According to the position of the face(s) or the brightness in the environment, the front flash can be controlled to perform the light filling function to change the color temperature of the captured image or change the light intensity for capturing the image. For example, the color of the front flash light can be modulated to change the color temperature of the captured frame or the intensity of the front flash light can be modulated to change the light intensity for capturing the image.

Furthermore, the electric device 200 can provide pan focus function or the camera 206 can focus on the objects in the distance of 0.5 m to 2.5 m from the electric device 200. Therefore, the image of the objects, for example, the faces, in the distance of 0.5 m to 2.5 m can be clear even the objects are moving, which is helpful to the fact tracking function.

The important region of interest may relate to the face image disclosed above or other objects or things the user may have interest in. Although the above embodiments are exemplified by the Android operating system, the invention is not limited thereto and can also be used in other operating systems.

Furthermore, according to one embodiment, an non-transitory storage media for storing a program code is provided. When the program code is executed by the electric device 200, the electric device 200 performs the method for performing the face tracking function described above.

By using the VTE floating control interface 704, the face tracking function and/or the function of enlarging and stitching important regions of interest to form a target frame can be achieved without having to modifying the programming code of the VT application 702 (such as Skpye and Line), especially when the VT application 702 does not support the foresaid functions. That is, by means of the VTE floating control interface 704, the VTE native application 708, the face detector 716, the face tracking engine 718, and the cutting and stitching unit 720 provided by original equipment manufacturers (OEM), the video talk application software included in the white list can be equipped with face tracking function and/or capable of enlarging and stitching regions of interest into a new target frame. Without having to modify the programming code of the communication program (VT application 702) (such as Skype and Line) for video talk, the above objects can be achieved to provide the user with more video talk functions, improve the quality of video talk, achieve a better experience of use, and increase the market competitiveness for products.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for performing a face tracking function in an electric device, the electric device having a touch panel, a camera, and a processor, the method comprising:
  receiving a touch signal by the touch panel;
  under a video call, entering a face tracking mode based on the touch signal by the processor;
  performing face tracking on a captured frame from the camera to automatically obtain multiple regions of interesting (ROIs) of the captured frame by the processor, each of the ROIs having a face object;
  cutting the multiple ROIs with multiple face objects from the captured frame and generating a target frame by combining the multiple ROIs with the multiple face objects by the processor; and
  transmitting the target frame containing the combined multiple face objects to another electric device by the processor, so that the target frame is shown on the another electric device as a video talk frame.

2. The method according to claim 1, further comprising displaying a floating control interface by the touch panel when the electric device runs a communicating program to perform the video talk with the another electric device, and the floating control interface has a face tracking control item;
  wherein the receiving step comprising receiving the touch signal by the touch panel when the face tracking control item is selected.

3. The method according to claim 2, further comprising:
  determining whether the electric device is performing the video talk by judging whether the communicating program is performed in foreground and whether the camera is activated, wherein the communicating program is listed in a white list.

4. The method according to claim 3, wherein a plurality of candidate communication programs are listed in the white list.

5. The method according to claim 1, wherein in the performing step, one ROI is obtained;
  Wherein the generating step comprises enlarging the ROI, and the target frame is generated according to the enlarged ROI.

6. The method according to claim 1, wherein in the performing step, more than one ROIs are obtained, the generating step comprises enlarging the ROIs, and the target frame is generated by combining the enlarged ROIs.

7. The method according to claim 1, wherein before the step of performing face tracking, the method further comprises performing face detecting on the captured frame from the camera to determining the location of the at least one face in the captured frame.

8. A electric device for performing a face tracking function, the electric device comprising:
  a touch panel, for receiving a touch signal;
  a camera, for capturing a frame; and
  a processor, for entering a face tracking mode based on the touch signal under a video call, and performing face tracking on the captured frame from the camera to automatically obtain multiple regions of interesting (ROIs) of the captured frame, each of the ROIs having a face object;
  wherein the processor is further for cutting the multiple ROIs with multiple face objects from the captured frame and generating a target frame by combining the multiple ROIs with the multiple face objects, and for transmitting the target frame containing the combined multiple face objects to another electric device, so that the target frame is shown on the another electric device as a video talk frame.

9. The device according to claim 8, further the touch panel further displays a floating control interface when the electric device runs a communicating program to perform the video talk with the another electric device, and the floating control interface has a face tracking control item;
  wherein the touch panel receives the touch signal when the face tracking control item is selected.

10. The device according to claim 9, wherein the processor further determine whether the electric device is performing the video talk by judging whether the communicating program is performed in foreground and whether the camera is activated, wherein the communicating program is listed in a white list.

11. The device according to claim 10, wherein a plurality of candidate communication programs are listed in the white list.

12. The device according to claim 9, wherein the floating control interface has a face tracking icon, acting as the face tracking control item.

13. The device according to claim 8, wherein the at least one ROI comprises one ROI, the processor further enlarges the ROI, and the target frame is generated according to the enlarged ROI.

14. The device according to claim 8, wherein the at least one ROI comprises more than one ROIs, the processor further enlarges the ROIs, and the target frame is generated by combining the enlarged ROIs.

15. The device according to claim 8, wherein the processor further performs face detecting on the captured frame from the camera to determining the location of the at least one face in the captured frame before the processor performs face tracking.

16. A non-transitory storage media for storing a program code, wherein when the program code is executed by an electric device, the electric device performs a method for performing a face tracking function, the electric device has a touch panel, a camera, and a processor, the method comprises:
- receiving a touch signal by the touch panel;
- under a video call, entering a face tracking mode based on the touch signal by the processor;
- performing face tracking on a captured frame from the camera to automatically obtain multiple regions of interesting (ROIs) of the captured frame by the processor, each of the ROIs having a face object;
- cutting the multiple ROIs with multiple face objects from the captured frame and generating a target frame by combining the multiple ROIs with the multiple face objects by the processor; and
- transmitting the target frame containing the combined multiple face objects to another electric device by the processor, so that the target frame is shown on the another electric device as a video talk frame.

17. The non-transitory storage media according to claim 16, wherein the method further comprises displaying a floating control interface by the touch panel when the electric device runs a communicating program to perform the video talk with the another electric device, and the floating control interface has a face tracking control item;
- wherein the receiving step comprises receiving the touch signal by the touch panel when the face tracking control item is selected.

18. The non-transitory storage media according to claim 17, wherein the method further comprises:
- determining whether the electric device is performing the video talk by judging whether the communicating program is performed in foreground and whether the camera is activated, wherein the communicating program is listed in a white list.

19. The non-transitory storage media according to claim 16, wherein when one ROI is obtained, the generating step comprises enlarging the ROI, and the target frame is generated according to the enlarged ROI;
- wherein when more than one ROIs are obtained, the generating step comprises enlarging the ROIs, and the target frame is generated by combining the enlarged ROIs.

20. The non-transitory storage media according to claim 16, wherein before the step of performing face tracking, the method further comprises performing face detecting on the captured frame from the camera to determining the location of the at least one face in the captured frame.

* * * * *